United States Patent Office 3,236,807
Patented Feb. 22, 1966

3,236,807
PROCESS FOR PREPARING POLY(UNSYMMETRI-CALLY - 2,6 - DISUBSTITUTED PHENYLENE) ETHER
Gelu Stoeff Stamatoff, Newark, Del., assignor to E. I. du Pont de Nemours & Company, Wilmington, Del., a corporation of Delaware
No Drawing. Filed May 2, 1961, Ser. No. 107,012
13 Claims. (Cl. 260—47)

The present invention relates to novel, poly(unsymmetrically-disubstituted phenylene)ethers, their method of preparation, and, more particularly, to high molecular weight, poly(unsymmetrically-disubstituted phenylene) ethers suitable as raw materials in the fabrication of films, fibers, and other molded and extruded shaped structures. This application is a continuation-in-part of an earlier application, Serial Number 31,544, now abandoned.

Although it has been known heretofore that 2,6-unsymmetrically-disubstituted phenols and 2,6-unsymmetrically-disubstituted-4-halophenols may be subjected to oxidative coupling, no method has been found to prepare high molecular weight, linear polyphenylene ethers through oxidation of 2,6-unsymmetrically-disubstituted phenolate ions. The term "unsymmetrically-disubstituted" is used herein to denote the non-similarity of the groups attached to the 2- and 6-positions of the phenol.

It is an object of the present invention to provide novel, high molecular weight poly(2,6-unsymmetrically-disubstituted phenylene)ethers. It is another object to provide a method for the polymerization of 2,6-unsymmetrically-disubstituted-4-halophenols to form poly(2,6-unsymmetrically disubstituted phenylene)ethers. Other objects will become apparent hereinafter.

The objects of the present invention are accomplished by a process comprising admixing an aqueous solution of a phenolate ion having the general formula

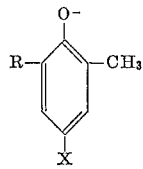

wherein R is selected from the group consisting of chlorine, bromine, iodine, alkoxy and alkyl groups, said alkoxy and alkyl groups having from two to four carbon atoms, and X is a halogen selected from the group consisting of bromine and iodine, and an oxidizing mixture comprising oxygen and a free radical initiator such as an inorganic peroxide or persulfate, in the presence of a liquid organic solvent immiscible with the aqueous phase and capable of dissolving the polymer as it forms, and recovering a solution of a polyphenylene ether in said organic solvent.

Oxidizing mixtures suitable to initiate the polymerization of the phenolate ion to high molecular weight poly (2,6-unsymmetrically-disubstituted)ethers are comprised of oxygen and water-soluble inorganic peroxides or persulfates, such as hydrogen peroxide or the alkali or alkaline earth metal peroxides and persulfates. The oxygen necessary for the polymerization is generally supplied to the reaction system by agitating the mixture while maintaining an atmosphere of air or oxygen. The reaction may be further catalyzed by the addition of a water-soluble salt of a polyvalent metal, such as copper sulfate, although the salt is not essential to the process. The peroxide or persulfate is used in polymerization initiator concentrations and, in general, varies from 0.001 to 10% by weight of the phenolate ion monomer.

It is essential that the polymerization be carried out in a two-phase system: a basic, aqueous medium of the phenolate ion and a water-insoluble organic phase which is a solvent for the formed polyphenylene ether. Suitable organic solvents are aromatic hydrocarbons, ethers, halogenated hydrocarbons and similar, known polymer solvents. The preferred solvents are aromatic solvents such as benzene, toluene and the xylenes. The solvents are preferably dispersed within the aqueous medium by mechanical agitation. Surface-active agents may be used to facilitate the dispersion. Anionic surfactants, an example of which is sodium lauryl sulfate, are preferred. The quantity of each of the liquids in the two-phase system is not critical except for the fact that it is desirable to have a sufficient quantity to maintain both the reactants and products in solution. In the case of the organic phase, the volume will vary with the polymer being formed and the organic solvent employed. It is preferable to use sufficient organic solvent so that a 5 to 25 weight percent solution of polymer is obtained.

The polyphenylene ethers of the present invention are obtained as indicated hereinabove by a two-phase polymerization process. An aqueous solution of the phenolate ion monomer is formed by mixing, usually in about stoichiometric quantities, the unsymmetrically-disubstituted phenol and an inorganic, water-soluble base which is preferably an alkali or alkaline earth metal hydroxide. Up to a 10 weight percent excess of the stoichiometric quantity of the base may be used. Larger quantities are to be avoided if high molecular weight polymers are desired. The polymerization proceeds with an increase in viscosity of the organic phase as the polymer is formed at the two-phase interface and subsequently is dissolved in the organic phase. Essentially quantitative yields are realized. An indication of molecular weights may be obtained by measurement of solution viscosities. The polymers made according to the present invention have inherent viscosities, as measured on a 0.5% solution in benzene at 25° C., of greater than 0.5 and usually greater than 1.0. The invention is further demonstrated by the following examples:

*Example I*

To a 180 ml. polyethylene bottle is added 100 ml. of water, 0.01 g. copper sulfate dissolved in 1 ml. of water, 0.05 g. sodium lauryl sulfate dissolved in 1 ml. of water, 0.044 mole lithium hydroxide, 0.0415 mole 2-methyl-4-bromo-6-isopropylphenol and 25 ml. of benzene. After the mixture is shaken for 15 minutes using a mechanical shaker to ensure dispersion, 0.0002 mole of ammonium persulfate dissolved in 1 ml. of water is added. Shaking is continued for two hours after which a like quantity of ammonium persulfate is added and shaking is continued for 48 hours. Air is supplied to the system throughout the entire time that oxygen is used up in the oxidative coupling reaction. The polymer is precipitated in acetone, filtered, washed with water and dried to give 5.5 g. of product having an inherent viscosity of 0.6 and a stick temperature of 220–230° C. The polymer may be compression molded at 200–250° C. into stiff, tough, transparent films which appear to be completely amorphous according to X-ray analyses.

*Example II*

Example I is repeated using in place of the 2-methyl-4-bromo-6-isopropylphenol a like molar quantity of 2-methyl-4-bromo-6-ethylphenol. This product, likewise, may be compression molded at 200–250° C. into stiff, tough, transparent films.

*Example III*

Example I is repeated using 0.0415 mole 2-methyl-4-bromo-6-n-butylphenol in place of the isopropyl derivative.

The product obtained as above has an inherent viscosity of 0.6.

*Example IV*

Example I is repeated using 0.0415 mole 2-methyl-4-bromo-6-chlorophenol in place of the isopropyl derivative. The product obtained as above has an inherent viscosity of 0.5.

The products prepared according to the present invention may have incorporated therein antioxidants fillers, pigments and the like. These polymers retain their dimensional stability at elevated temperatures and are useful as injection molding resins and in electrical and packaging applications.

I claim:
1. A process for the preparation of a poly(unsymmetrically-disubstituted phenylene)ether having an inherent viscosity, as measured on a 0.5% solution in benzene at 25° C., of greater than 0.5 which comprises admixing an aqueous solution of a phenolate ion having the general formula

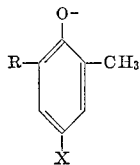

wherein R is a radical selected from the group consisting of chlorine, bromine, iodine and alkyl radicals, said alkyl radical containing from two to four carbon atoms, and X is a halogen selected from the group consisting of bromine and iodine, while maintaining an atmosphere selected from the group consisting of air and oxygen and in the presence of an initiator selected from the group consisting of inorganic peroxides and inorganic persulfates in amounts 0.001 to 10% by weight of the phenolate ion, and a water-immiscible organic phase, capable of dissolving the poly(unsymmetrically-disubstituted phenylene)ether, and recovering a solution of the poly(unsymmetrically-disubstituted phenylene)ether in said organic solvent.

2. A process according to claim 1 wherein R is ethyl.
3. A process according to claim 1 wherein R is isopropyl.
4. A process according to claim 1 wherein R is n-butyl.
5. A process according to claim 1 wherein X is bromine.
6. A process according to claim 1 wherein the phenolate ion is formed from 2-methyl-4-bromo-6-isopropylphenol.
7. A process according to claim 1 wherein the phenolate ion is formed by a reaction of the phenol with an alkali metal hydroxide.
8. A process according to claim 1 wherein the phenolate ion is formed by a reaction of the phenol with lithium hydroxide.
9. A process according to claim 1 wherein the initiator is ammonium persulfate.
10. A process according to claim 1 wherein the initiator is used in conjunction with a water-soluble salt of a polyvalent metal.
11. A process according to claim 10 wherein the water-soluble salt is cupric sulfate.
12. A process according to claim 1 wherein the water-immiscible organic phase is selected from the group consisting of aromatic, halogenated aromatic and halogenated aliphatic hydrocarbons.
13. A process according to claim 1 wherein the water-immiscible organic phase is benzene.

References Cited by the Examiner

UNITED STATES PATENTS 3,134,753  5/1964  Kwiatek _____ 260—47

OTHER REFERENCES

Hunter et al.: J.C.S., vol. 55, pages 3701–3705, September 1933.

Staffen et al.: J.A.C.S., vol. 82, July 1960.

WILLIAM H. SHORT, *Primary Examiner.*